United States Patent [19]

Struger et al.

[11] Patent Number: 5,949,673
[45] Date of Patent: Sep. 7, 1999

[54] HYBRID CENTRALIZED AND DISTRIBUTED INDUSTRIAL CONTROLLER

[75] Inventors: Odo Struger, Chagrin Falls; Robert J. Coppenhaver, Bainbridge, both of Ohio

[73] Assignee: Allen-Bradley Company, LLC, Milwaukee, Wis.

[21] Appl. No.: 08/876,059

[22] Filed: Jun. 13, 1997

[51] Int. Cl.$^6$ ........................................ G05B 15/00
[52] U.S. Cl. ............... 364/131; 364/140.07; 364/140.08; 364/188; 364/191
[58] Field of Search ............... 364/140.07–140.08, 364/131–136, 188–190, 191–192, 578, 146, 147, 185, 488, 491, 900; 395/155, 159, 161, 500, 650, 700; 340/825.52, 825.36, 825.37, 825.07–825.08

[56] References Cited

U.S. PATENT DOCUMENTS

| | | |
|---|---|---|
| 3,810,118 | 5/1974 | Kiffmeyer ........................ 340/172.5 |
| 3,942,158 | 3/1976 | Dummermuth ................... 340/172.5 |
| 4,165,534 | 8/1979 | Dummermuth et al. ............. 364/900 |
| 4,442,504 | 4/1984 | Dummermuth et al. ............. 364/900 |
| 5,099,449 | 3/1992 | Dombrosky et al. ............... 395/800 |
| 5,193,189 | 3/1993 | Flood et al. ...................... 395/650 |
| 5,245,331 | 9/1993 | Gibbons ......................... 340/825.52 |
| 5,452,201 | 9/1995 | Pieronek et al. ................. 364/188 |
| 5,530,643 | 6/1996 | Hodorowski ..................... 364/191 |

*Primary Examiner*—William Grant
*Assistant Examiner*—Ramesh Patel
*Attorney, Agent, or Firm*—Keith M. Baxter; John M. Miller; John J. Horn

[57] ABSTRACT

A pass-through table is developed to work in conjunction with an I/O table of a centralized industrial controller to permit a centralized controller to work seamlessly with a highly distributed control system. The pass-through table indicates data used in common between the centralized controller and the distributed controller and monitors a link connecting the distributed controller for changes in variables on the pass-through table to write those changes to the I/O table of the centralized controller. Conversely, changes in the I/O table of the centralized controller are detected and transmitted out to the common link to the distributed controller.

8 Claims, 3 Drawing Sheets

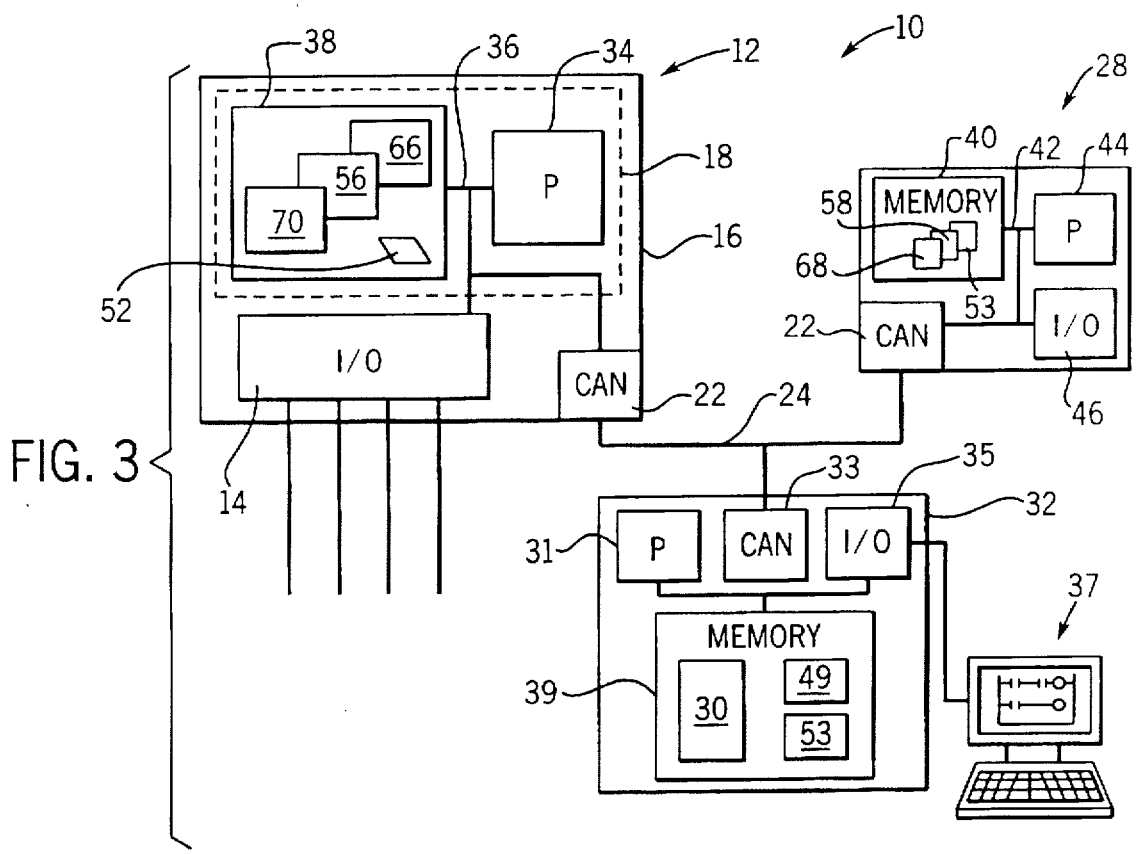
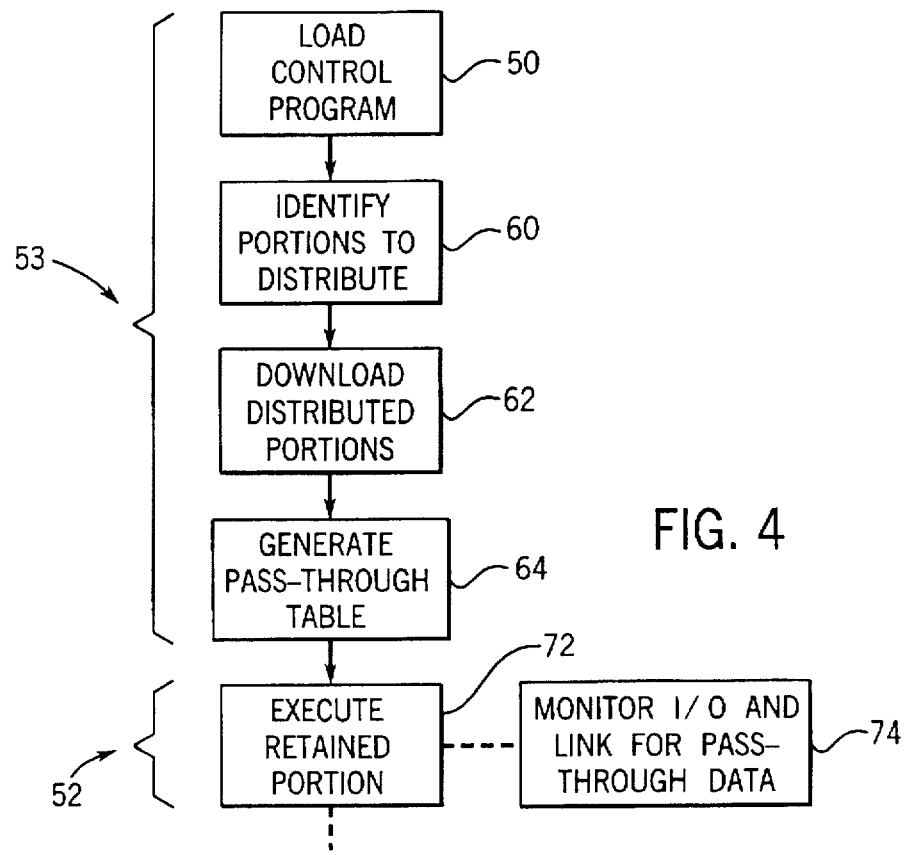
FIG. 3
FIG. 4

HYBRID CENTRALIZED AND DISTRIBUTED INDUSTRIAL CONTROLLER

CROSS-REFERENCE TO RELATED APPLICATIONS

STATEMENT REGARDING FEDERALLY SPONSORED RESEARCH OR DEVELOPMENT

BACKGROUND OF THE INVENTION

This invention relates to industrial control systems for controlling factories and the like, and in particular to an industrial control system where a control program is executed by many spatially separated processing units.

Centralized industrial controllers such as those described in U.S. Pat. Nos. 3,810,118; 3,942,158; 4,165,534; and 4,442,504 are high speed computers that may be connected to industrial equipment, such as an automated assembly line or machine tool, to operate such equipment in accordance with a stored program. The stored program includes instructions, which when executed, examine the condition of selected inputs to the centralized controller from sensing devices on the controlled equipment, and energize or de-energize selected outputs or actuators from the centralized controller to operate devices on the controlled equipment.

Inputs to the industrial controller may be discrete binary signals, such as those from switches, which may detect limits of process variables such as motion, temperature, time or other quantities or the inputs may be analog measures of process variables which are generally then converted to digital words for processing, or the inputs may be multi-variable information. Similarly, the outputs of the industrial controller are provided by mechanical or solid state relays, if the outputs are binary; or by means of a digital analog converter if the outputs are analog voltages or the like.

Some of the inputs and outputs to the centralized controller may be remotely located from the centralized controller and connected to the controller by means of a dedicated digital communication link. Typically, the link connects the centralized controller with a remote I/O rack at which a number of inputs and outputs are clustered.

The centralized architecture of current industrial control systems reflects the historically high cost of computer hardware that is minimized by the use of a single centralized controller. Computer hardware is much cheaper now, nevertheless, centralized architecture still provides important advantages. A centralized controller provides a convenient single location for generating reports about operation of the controlled process for handling faults in the control process, for initializing the control system, and for synchronizing tasks. A centralized controller capable of holding the entire control program simplifies programming, editing, and troubleshooting of the control program, and allows use of well established software tools for these purposes. Most control programs in use today are written for centralized controllers; conversion of these programs to other architectures would be costly and time consuming.

Nevertheless, the centralized controller architecture is not ideal for all tasks. In a "highly distributed control system", the control program is allocated among many spatially separate and smaller controllers. These controllers may be located near particular points on the controlled process where inputs are obtained from a controlled process or outputs to the controlled process are produced. Such highly distributed control can be extremely fast because of the effective parallel processing of the multiple controllers and, in certain circumstances, inexpensive because the proximity of the controllers to their control points reduces expensive point to point wiring. On the other hand, highly distributed control systems may be prone to bandwidth limitation problems insofar as the variables for the control program must be constantly rebroadcast to other distributed controllers possibly overtaxing the capacity of the common communications link.

For many control applications, neither a centralized controller nor a highly distributed controller will provide the perfect solution. In these cases, a hybrid system, for example, one using some highly distributed architecture components with a centralized controller might be desired. Generally, however, these two architectures are incompatible.

BRIEF SUMMARY OF THE INVENTION

The present invention provides a simple method of allowing intermixing of centralized controller and highly distributed controller components in a single control system.

In the present invention, the centralized controller incorporates a pass-through table listing data elements shared between a portion of the control program retained by the centralized controller and the portions of the control program allocated to the distributed controllers. This pass-through table is used to provide a virtual connection between the common link of the highly distributed controller architecture and the internal I/O table of the centralized controller. This virtual connection permits the two architectures to work seamlessly with each other.

Specifically, the present invention allows a centralized controller to be used with a highly distributed control system controlling an industrial process according to a control program divided among the centralized controller and multiple distributed processing units interconnected on a common communication link. The distributed processing units receive data from other distributed processing units and the industrial process and process it according to a contained portion of the controller program to provide data to the other distributed processing units and the industrial process. The centralized controller includes a program memory holding a portion of the controlled program and has dedicated inputs and outputs for receiving data from the industrial process and providing data to the industrial process, respectively, according to the portion of the control program. The centralized controller also incorporates an I/O table storing current values of the dedicated inputs and outputs and a pass-through table identifying ones of the input and output values also used by portions of the control program contained in the distributed processing units. A processor in the centralized controller, executing a stored operating program, transmits the identified input and output values on the common communication link to the distributed processing units.

Thus it is one object of the invention to provide a simple method of mixing highly distributed control components and centralized control components. A principle difference between these architectures is that highly distributed architectures must make its data values manifest to all distributed processing units by transmitting them along a common communication link. Accordingly, the use of a pass-through table permits normally internal I/O table values of the centralized controller to be visible to highly distributed components which may use or change those values.

It is yet another object of the invention to provide the benefits of a mixed highly distributed and centralized control system while preserving the highly distributed controller's low bandwidth common communication link. The use of the pass-through table permits only selective portions of the internal I/O table of the centralized controller to be broadcast on the common communication link preserving scarce link bandwidth.

The processor executing the stored operating program may also monitor the communication link for input and output data, from the distributed processing units, and identified by the pass-through table, to transfer that data to the I/O table of the centralized controller and using it in its stored program.

Thus it is another object of the invention to provide integration between a centralized controller and a highly distributed controller both for data needed by the distributed processing units and for data needed by the centralized controller. The pass-through table may be used to describe data flowing in both directions without regard to the direction of transfer.

The processor of the centralized controller may review the entire control program and the portion of the control program executed by the centralized controller to generate the pass-through table. The pass-through table may incorporate only data common to the portion of the control program executed by the centralized controller and the portion of the control program not executed by the centralized controller.

Thus it is another object of the invention to provide an automatic generation of a pass-through table by the centralized controller. The control program may be loaded into the centralized controller where different portions of the control program are identified for distribution to the distributed processing units. The centralized controller may then download the different portions to the distributed processing units and at the same time generate the necessary pass-through table.

Thus it is therefore yet another object of the invention to provide a centralized repository for the entire control program in a highly distributed system.

BRIEF DESCRIPTION OF THE SEVERAL VIEWS OF THE DRAWINGS

FIG. 3 is a schematic block diagram of a centralized controller and a distributed processing unit showing the principle components of each;

FIG. 4 is a flow chart showing the steps of the processor of the centralized controller of FIG. 3 in downloading portions of the control program to the distributed processing is and the generating of a pass-through table to provide data transparency between different architectures.

DETAILED DESCRIPTION OF THE INVENTION

Figure 1:
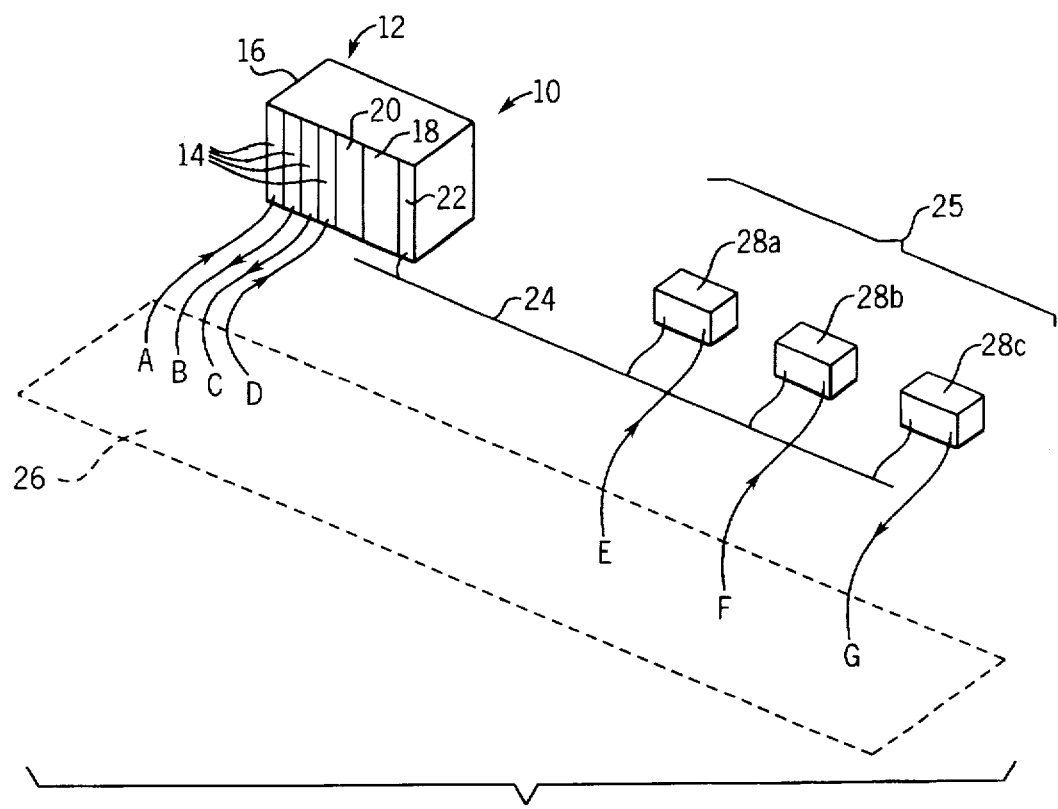
FIG. 1 is a perspective view of a hybrid centralized and distributed controller system per the present invention showing various inputs and outputs between the system and a itrary controlled process.

Referring to FIG. 1, a hybrid controller system 10 includes a centralized controller 12 such as a programmable logic controller (PLC) and components of a distributed control system 25. The centralized controller 12 has dedicated input/output (I/O) modules 14, a processor module 18 operating as a specialized computer, and other modules such as a power supply 20 all interconnected within a housing 16 by a common backplane (not shown). Controllers of this type are well known in the art. The I/O modules 14 communicate directly with the processor module 18 via the dedicated backplane of the centralized controller 12.

The centralized controller 12 includes a link module 22 providing a communication link between the processor 34 and a common communication link 24. One such link controller is an 80C592 microcontroller preprogrammed for executing the CAN protocols as is commercially available from e.g., Signetics Corporation having offices in Sunnyvale, Calif. The CAN specification defines the requirements which comprise the media access control (MAC) and physical signaling layers of the ISO/OSI for data communication networks. The CAN protocols are specified in ISO document ISO/TC22/SC3/WG1 as authored by Robert Bosch GmbH, hereby incorporated by reference. Other communication link protocols may also be used.

The I/O modules 14 of the centralized controller may be connected to a controlled machine or process 26 to provide various electrical signals to the controlled process 26 (henceforth termed "outputs") and to receive various signals from the controlled process 26 (henceforth termed "inputs"). As depicted, the centralized controller 12 receives two inputs labeled A and D and provides two outputs labeled B and C.

As will be understood to those of ordinary skill in the art, the inputs A and D are typically read in through an I/O module 14 by a dedicated scanning circuit (not shown) and written to an internal memory termed the I/O table. Output values also in the I/O table are periodically read out through the I/O modules 14 by the dedicated scanning circuit to the controlled process 26. In this way, a control program executed by the centralized controller 12 may simply read data from and write data to the I/O table in a manner similar to that of a general purpose computer reading and writing data to and from memory without concern for interface to the controlled process 26.

The common communication link 24 connects the centralized controller 12 to one or more distributed processing units 28a–28 c. These processing units 28 differ from the centralized controller 12 in that they have limited processing capabilities and limited memory to have lower cost. Typically, these processing units 28 will also have modest input or output capabilities and may in fact be constructed into the housing of various actuators or sensors so that, for example, a limit switch incorporating a processing unit 28 may be connected directly to the common link 24.

Although each processing unit 28 has limited processing capability, operating together, they provide a high level of processing capability. A highly distributed architecture utilizing processing units 28 is described in U.S. Pat. No. 5,530,643 issued Jun. 25, 1996 and U.S. Pat. No. 5,452,201 issued Sep. 19, 1995, both assigned to the assignee of the present invention hereby incorporated by reference.

As depicted, processing unit 28a senses an input from the controlled process 26 designated E and processing unit 28b senses an input from the controlled process 26 designated F. Processing unit 28c provides an output to the controlled process 26 designated G.

Referring now to FIGS. 1 and 3, generally, the processor module 18 of the centralized controller 12 will include a processor 34 connected via an internal bus 36 to a memory 38. The internal bus 36 also connects to the CAN link module 22 (providing communications on link 24) and the I/O modules 14. In practice, the internal bus 36 is a backplane positioned along the rear of housing 16 into which various modules may plug.

The distributed processing units 28 have a similar architecture however with a much smaller memory 40 connected by an internal bus 42 to a processor 44. This bus 42 may also connect to the link module 22 and to one or more I/O points provided by interface circuitry 46. Multiple components of the distributed processing unit 28 may be contained in a single chip as is well understood in the art.

Referring to FIG. 3, a complete control program 30 may be written and edited on a programming station 32. The programming station 32 includes generally a processor 31, a link module 33, an I/O port 35 connected to a keyboard and display 37 and a memory 39, as will be understood to those of ordinary skill in the art. The development of the complete control program 30 may use standard development software 49 providing development, editing, and troubleshooting tools such as are well understood in the art.

Figure 2:
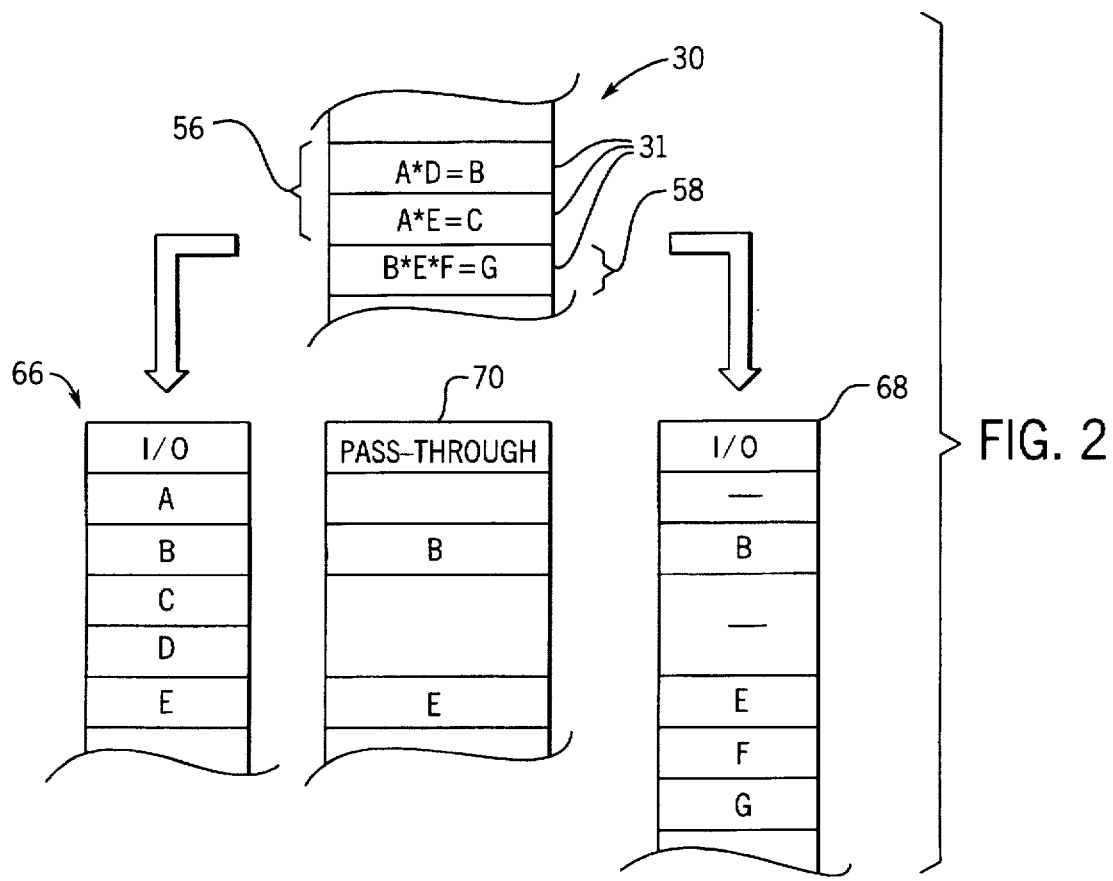
FIG. 2 is block diagram showing an allocation of a single control program into different portions to be loaded into the distributed processing units and the centralized controller, and showing the generation of an I/O table for the centralized controller and a virtual I/O table for the distributed processing units from which a pass-through table for the centralized controller may be automatically created.

Referring now to FIG. 2, for example, simplified complete control program 30, expressed in Boolean statements, calculates values of binary outputs B, C, and G to the controlled process 26 (shown in FIG. 1) from binary inputs A, D, E and F from the controlled process 26. Per this complete control program 30, output B is the Boolean AND of inputs A and D and the output C is the Boolean AND of inputs A and E. Output G of the distributed processing units 28 is the Boolean AND of inputs B, E and F.

The following Table 1 shows the complete control program 30 in symbolic notation provided by three lines of code where the symbol '·' signifies a Boolean AND.

| Line Number | Code |
|---|---|
| 1 | A · D = B |
| 2 | A · E = C |
| 3 | B · E · F = G |

As will be apparent from inspection, the output B may be computed entirely within the centralized controller 12 which has direct access through its I/O modules 14 of variables A and D. In contrast, output C from the centralized controller 12 requires knowledge of input A to the centralized controller 12 and input E to one of the processing units 28a. Similarly, output G requires inputs B, E and F from three different units, the centralized controller 12 and processing units 28a and 28b.

Referring to FIG. 3, the complete control program 30 is divided among the centralized controller 12 and the distributed processing units 28 by a distribution program 53 are also stored in memory 39 of the programming station 32.

Referring also to FIG. 4 in a first process block 50 of the distribution program 53, the complete control program 30 is loaded into memory 39 prior to being partitioned for downloading into different distributed processing units 28. A number of partitioning systems may be used as are described in co-pending U.S. applications Ser. No. 08/360,862 filed Dec. 21, 1994 and Ser. No. 08/733,378 filed Oct. 17, 1996, hereby incorporated by reference. One simple and highly effective partitioning system allocates each line of the complete control program 30 that calculates an output (e.g. B, C or G), to the distributed processing unit 28 (or centralized controller 12) having a direct connection to that output in the controlled process 26. Thus, a first partial control program 58 of the complete control program 30 including the two lines providing for the calculation of variables B and C would be loaded into the centralized controller 12 which have direct connections to outputs B and C. On the other hand, a second partial control program 58 of the control program including the final line of the complete control program 30 would be loaded into distributed processing unit 28c which provides a direct connection to the variable G.

Identifying the location of the lines of the complete control program 30 in physical hardware is indicated by process block 60 of FIG. 4. At succeeding process block 62, the partial control programs 58 and 56 of the total complete control program 30 to be allocated to the distributed processing units 28 and centralized controller 12, respectively, are downloaded through the common link 24 to the memories 40 of the distributed processing unit 28 and the memory 38 of the centralized controller 12 (shown in FIG. 3). For example, line 3 will be loaded into distributed processing unit 28c which, when activated, will monitor the link 24 for values of B, E and F and change its value G accordingly. Distributed processing unit 28a and 28b in this example, which have no lines of code allocated to them because they are only input devices, provide only the baseline functionality of an operating program (not shown) which operates to receive inputs E and F and report changes in them on the link 24. Lines 1 and 2 of the complete control program 30 will be downloaded to the centralized controller 12.

Referring now to FIGS. 4 and 2, at process block 64 following the downloading of the portions of the complete control program 30 to the distributed processing units 28a–28c and centralized controller 12, a pass-through table 70 is generated and downloaded to the centralized controller 12. The generation of the pass-through table 70 may be performed automatically by the distribution program 53 once the partitioning of the complete control program 30 is finished. Specifically, the partial control program 56 of the complete control program 30 that will be downloaded to the centralized controller 12 is scanned for each variable A through G contained in a line of that partial control program 56. These variables will be allocated space in the I/O table 66 used by the centralized controller 12. The I/O table 66 stores the current values of inputs and outputs that will be used by the partial control program 56 of the complete control program 30 in the centralized controller 12 and is automatically updated by the I/O modules 14 as has been described. The partial control program 58 of the complete control program 30 that is downloaded to any of the distributed processing units 28a–28c is then scanned to produce a second implicit I/O table 68, portions of which may be recreated in the distributed processing unit 28.

In the current example, the partial control program 56 of the complete control program 30 will produce an I/O table 66 listing variables A through E. Similarly, partial control program 58 of the complete control program 30 will produce an implicit I/O table 68 having only variables B and E through G.

The pass-through table 70 is then created having only the common elements between tables 66 and 68 (i.e., B and E). The pass-through table 70 thus lists the variables that must be shared between the centralized controller 12 and the distributed processing unit 28.

Figure 5:
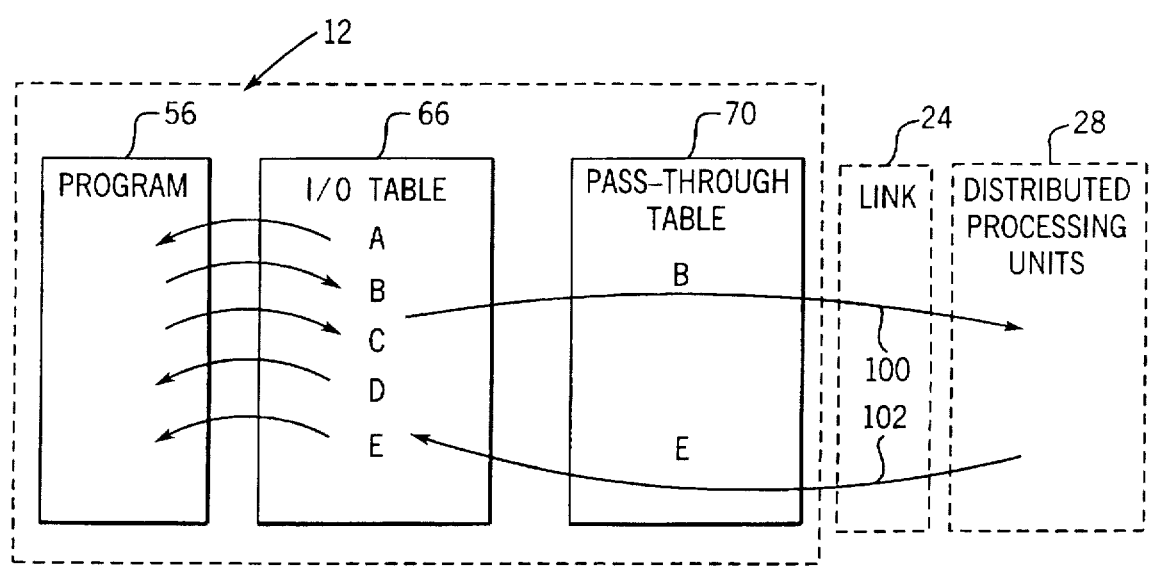
FIG. 5 is a schematic representation of the transfer of data between the centralized controller of FIG. 3 and the distributed processing units per the present invention.

Referring again to FIG. 4 and also to FIG. 5, the downloaded partial control program 56 of the complete control program 30 is then executed by the processor 34 of the centralized controller 12 as indicated by process block 72 of an executive program 52. Concurrently, as indicated by process block 74, the I/O table 66 and link 24 are monitored for information indicating a change in any of the variables listed in the pass-through table 70.

Specifically, for each change of an I/O variable in table 66 that is also listed in the pass-through table 70, the information indicating the change of the variable is transmitted on the common link 24 to the distributed processing units 28 in a manner compatible with their protocol as indicated by arrow 100 in FIG. 5. Thus, the centralized controller 12 looks like a virtual distributed processing unit 28 transmitting a change of variable value in the same way that distributed processing units 28a or 28b might indicate changes in their variables E or F. Thus, changes in the internal I/O table 66 are reflected onto the common link 24 to be visible to the distributed control system 25.

Similarly, the executive program 52 executed in process block 74 monitors the link 24 for any indication from the distributed control system 25 of a change in any of its variables on the pass-through table 70. These changes are captured and written to I/O table to indicate the changes in these variables as indicated by arrow 102 in FIG. 5. Thus, each of the distributed processing units 28 of the distributed control system 25 becomes an effective dedicated input and output to the centralized controller 12.

The generation of the pass-through table 70 may be automatically performed by the programming station 32 which retains the complete control program 30 in its memory. It follows too that in the event that the system needs to be reloaded, the programming station 32 may act as a centralized repository for the complete control program 30 and may quickly re-establish the control system from its internal memory.

The use of the pass-through table 70 provides a simple and transparent interface between a distributed control system 25 and centralized controller 12 that allows the components of each control system to be arbitrarily mixed in a single hybrid controller system 10.

The above description has been that of a preferred embodiment of the present invention. It will occur to those that practice the art that many modifications may be made without departing from the spirit and scope of the invention. For example, other languages than the sample Boolean style language described in the above specification may be used to produce the complete control program 30 and other allocation systems used to distribute portions of that control program among the processing units of the distributed control system. It will be understood that the operating program of the present invention may be executed by multiple processors and that portions may be executed in sequence on different machines. Accordingly, processor 34 should be recognized to embrace a single processor or a collection of processors performing the steps described.

In order to apprise the public of the various embodiments that may fall within the scope of the invention, the following claims are made.

We claim:

1. A centralized controller for use in a highly distributed control system controlling an industrial process according to a control program exchanging first I/O values with the controlled process for control thereof, the control program divided among the centralized controller and multiple distributed processing units on a common communications link, the distributed processing units receiving second I/O values and processing them according to at least one, first partial control program being part of the control program, the centralized controller comprising:

(a) an electronic memory holding:
   (i) an operating program;
   (ii) a second partial control program being a part of the control program;
   (iii) an I/O table holding the first I/O values;
   (iv) a pass-through table;
(b) a plurality of inputs and outputs dedicated to the centralized controller for receiving the first I/O values from the industrial process and providing the first I/O values to the industrial process respectively according to the second partial control program; and
(c) a processor executing the operating program to:
   (i) store current first I/O values of the inputs and outputs in the I/O table;
   (ii) review the pass-through table to identify ones of the current first I/O values required by the first partial control program; and
   (iii) transmitting the identified ones of the current first I/O values on the common communications link to the distributed processing units.

2. The centralized controller of claim 1 wherein the processor transmits the identified inputs and outputs upon detecting changes in the first I/O values in the I/O table.

3. The centralized controller of claim 1 wherein the processor executing the operating program also reviews the pass-through table to identify ones of the second I/O values required by the second partial control program contained in the centralized controller; and wherein the processor monitors the communications link for the second I/O values from the processing units and identified by the pass-through table and transfers those second I/O values to the I/O table.

4. The centralized controller of claim 1 wherein the pass-through table is generated by comparing the control program to at least one of the partial control programs.

5. The industrial controller of claim 4 wherein the pass-through table includes all I/O values common to the first partial control program and the second partial control program.

6. A method of constructing a hybrid centralized and highly distributed control system employing a centralized controller and multiple distributed processing units connected on a common communications link the controller and the distributed processing units exchanging I/O data values with the controlled process for control thereof, the method comprising the steps of:

(a) generating the control program employing the data values;

(b) identifying different portions of the control program to be executed by the multiple distributed processing units and the centralized processor;

(c) loading the different portions of the control program to be executed by the multiple distributed processing units and the centralized controller into the processing units and the centralized controller;

(d) comparing the different portions of the control program to produce a pass-through table of data values employed by both the distributed processing units and the centralized controller;

(e) executing on the centralized controller the portion of the control program used by the centralized controller;

(f) during execution of step (e), transmitting data included in the portion of the control program used by the centralized controller on the common communication link when the data is identified by the pass-through table.

7. The method of claim 6 wherein step (f) transmits data only when the control program used by the centralized controller changes the value of data identified by the pass-through table.

8. The method of claim 7 including the step of (g) monitoring the communications link to detect data changed by a distributed processing unit and conforming data used by the centralized controller to the detected data when the detected data is in the pass-through table.

* * * * *